Figure 2:
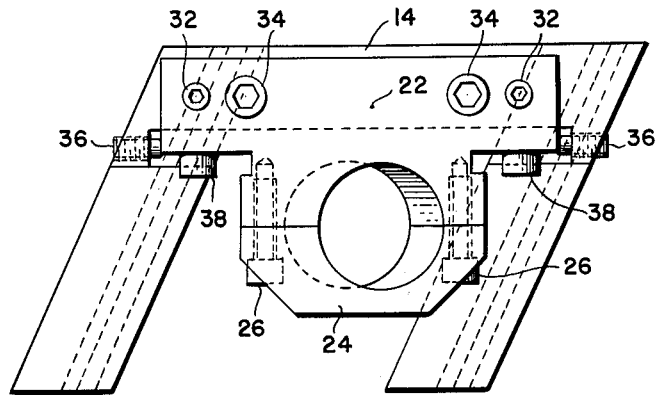

March 13, 1956 P. J. WENZ 2,737,855

PORTABLE GEAR TOOTH FINISHING MACHINE

Filed Oct. 18, 1951

INVENTOR.
PHILIP J. WENZ
BY
ATTORNEYS

United States Patent Office 2,737,855
Patented Mar. 13, 1956

2,737,855

PORTABLE GEAR TOOTH FINISHING MACHINE

Philip J. Wenz, West Trenton, N. J., assignor to De Laval Steam Turbine Company, Trenton, N. J., a corporation of New Jersey Application October 18, 1951, Serial No. 251,910

3 Claims. (Cl. 90—9)

This invention relates to a portable gear tooth finishing machine and has particular reference to a device for refinishing damaged gearing.

Gearing during use is subject to wear which frequently is non-uniform and causes considerable departure of the working surfaces of the gear teeth from their proper shape. If the gears are of small size they may, of course, generally be replaced without excessive cost or may be removed and refinished on machines similar to those originally used in generating the teeth. When, however, the gears are of the very large types used for ship propulsion, the matter of refinishing is particuarly serious. In fact, it sometimes happens that a large ship gear cannot be removed from the gear reduction unit without removing major parts of the ship structure. In other words in many instances the ship is to a large extent built around such gearing after it is installed, there being made no provision for its ready removal. It will be evident that in such cases provision must be made for refinishing primarily by hand operations, and this has been commonly done by hand filing and scraping which at best is a very slow and unsatisfactory procedure. Various types of damage occur, sometimes due to foreign or abrasive materials entering between the gear teeth while, at other times, the damage is due to more or less uniform wear on the entire set of teeth of a gear but localized as to the individual teeth to produce noise and vibration. For example, undercutting of the teeth below the pitch line may occur resulting in what may be described as hooking of the teeth of a cooperating gear and pinion. If under the various conditions of damage the working surfaces of the teeth may be refinished to substantially their original shapes there will be created increased backlash but, at the same time, smooth running will be again attained. In ship propulsion increased backlash is not particularly serious and may be tolerated.

The general object of the present invention is to provide a device which may be used for refinishing gear teeth, the device being particularly adapted to the refinishing of large gears and pinions of marine reduction units. In accordance with the invention the device mounts a portable tool for example a rotary file and serves to guide it along teeth to be refinished there being provided adjustments for the purpose of accurately positioning the tool to secure the desired finished surface of the tooth.

Figure 1:
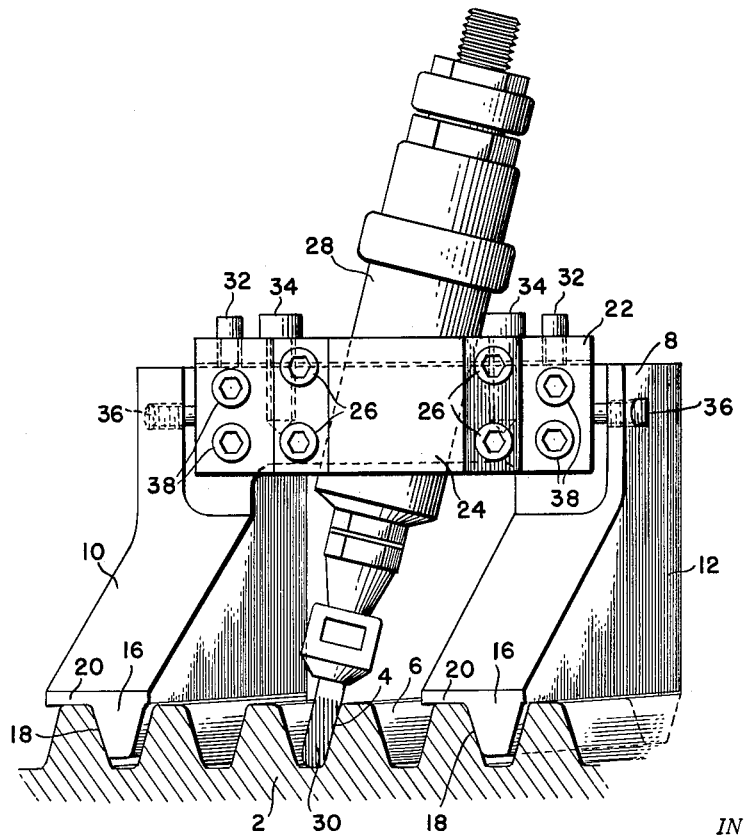

The foregoing general object of the invention as well as subsidiary objects relating to details of construction will become apparent from the following description read in conjunction with the accompanying drawing, in which:

Figure 1 is an elevation of a device provided in accordance with the invention, this being shown in association with a portion of a gear which is illustrated in section; and Figure 2 is a plan view of the device with the tool omitted.

A portion of the periphery of a gear being refinished is indicated at 2. It may be assumed that the faces and/or flanks on the sides 4 of the teeth require refinishing while the sides 6 of the teeth are relatively undamaged. This, in fact, will generally be the case, the damage being done to the working surfaces of the teeth. Under these circumstances the undamaged surfaces 6 may be used for guidance of the refinishing tool as will become clearer hereafter.

The device in a preferred and practical form comprises a yoke 8 which includes legs 10 and 12 integral with a cross member 14, the arrangement being such as to provide clearance and visibility.

The legs 10 and 12 are provided with elongated teeth 16 adapted to fit the surfaces 18 of spaced teeth on the gear. As illustrated in the drawing the device is adapted for the refinishing of helical gear teeth and consequently the tool is to be guided for movement in a skew direction with respect to the axis of the gear, the teeth 16 being provided accordingly.

To determine the radial position of the device there may be provided flanges 20 adjacent to the teeth 16 on the yoke, these flanges engaging the tops of the teeth. However, in cases where the tops of the teeth are damaged such flanges may be omitted, accurate positioning nevertheless resulting merely from the shapes of the teeth 16 engaging the undamaged faces of the gear teeth.

A member 22 is associated with the yoke and is provided with a socket closed by a clamp 24 to secure in position under the action of screws 26 the casing 28 of the finishing tool which may, for example, take the form of a rotary file 30. It will be evident that the particular tool used which is of hand type may take various forms: it may, for example, be of pneumatic type which is illustrated or may be of electrically driven flexible shaft type or of still some other type. In any event the tool is securely positioned with respect to the member 22.

While the device as a whole is desirably constructed to fit the particular job, minor adjustments for securing a high degree of accuracy of results are desirable and for this purpose there are provided several adjustments of the member 22 with respect to the yoke. An adjustment for radial position of the tool with respect to the gear axis and for tilting of the tool is provided by screws 32 and 34. The screws 32 are threaded into the member 22 and bear against the outer surface of the connecting portion 14 of the yoke, while the screws 34 extend through openings in the member 22 and are threaded into the yoke, the holes in the member 22 through which the screws pass being sufficiently enlarged to permit both tilting and a minor degree of movement in a direction along the periphery of the gear. Fine peripheral adjustment is provided by a pair of screws 36 threaded into the legs of the yoke and bearing against the ends of the member 22. To provide rigidity the member 22 is secured to the yoke by screws 38 which pass through openings in the member 22 with clearance and are threaded into the yoke.

It will be evident that the foregoing adjustments provide substantial universality of adjustment of the tool 30 with reference to the teeth 16 of the yoke with the result that using a pair of the gear teeth as guides the tool may be accurately adjusted with respect to the tooth face on which it is to act.

The operation of the device will now be apparent. After the tool is set in properly adjusted position the operator need only cause it to move along the face of a tooth to be refinished, the tool being then guided by engagement of teeth 16 in sliding fashion with the undamaged faces of the gear teeth. The result is a guidance of the tool eliminating the necessity for the exercise of skill in securing the desired shape of the tooth surface. In cases of bad damage or of a desire to produce a fine finish it will be evident that several tools such as 30 may be provided, an initial tool for example to provide a rough cut and then another tool for a fine cut, there being made necessary minor adjustments in the position of the tool with respect to the yoke. While in the case of a large gear the surface of a tooth will be substantially a plane, it will be evident that when required the tool itself may be contoured to provide the desired tooth surface.

It will be clear that various changes may be made in adapting the invention to practice depending upon the particular results desired, without departing from the scope of the invention as defined in the following claims.

What is claimed is:

1. A device for refinishing the working faces of teeth of a gear comprising a member having parallelly extending surfaces constructed and arranged to fit simultaneously against surfaces of undamaged faces of teeth of the gear being refinished extending parallel to the working faces of the teeth, a tool holder carried by said member and a gear tooth refinishing tool carried by said holder, said tool being positioned by said member and said tool holder for guided movement along the working face of a gear tooth to be refinished when said member surfaces are moved along undamaged gear teeth faces in guided engagement therewith.

2. A device for refinishing the working faces of teeth of a gear comprising a member having parallelly extending surfaces constructed and arranged to fit simultaneously against surfaces of undamaged faces of teeth of the gear being refinished extending parallel to the working faces of the teeth, a tool holder carried by said member, means for providing fine adjustment of said holder in said member both radially and peripherally of a gear engaged by said member surfaces, and a gear tooth refinishing tool carried by said holder, said tool being positioned by said member and said tool holder for guided movement along the working face of a gear tooth to be refinished when said member surfaces are moved along undamaged gear tooth faces in guided engagement therewith.

3. A device for refinishing the working faces of teeth of a gear comprising a member having parallelly extending surfaces constructed and arranged to fit simultaneously against surfaces of undamaged faces of teeth of the gear being refinished extending parallel to the working faces of the teeth, a tool holder carried by said member, means for providing fine adjustment of said holder relative to said member in two orthogonally related directions and also angularly, and a gear tooth refinishing tool carried by said holder, said tool being positioned by said member and said tool holder for guided movement along the working face of a gear tooth to be refinished when said member surfaces are moved along undamaged gear teeth faces in guided engagement therewith.

References Cited in the file of this patent

UNITED STATES PATENTS

| | | |
|---|---|---|
| 431,139 | Curtiss | July 1, 1890 |
| 1,715,949 | Rich | June 4, 1929 |
| 2,140,120 | Tomarin | Dec. 13, 1938 |
| 2,400,933 | Johnson et al. | May 28, 1946 |